United States Patent
Bae et al.

(10) Patent No.: US 9,373,034 B2
(45) Date of Patent: Jun. 21, 2016

(54) APPARATUS AND METHOD FOR TRACKING OBJECT

(71) Applicant: Hanwha Techwin Co., Ltd., Changwon-si (KR)

(72) Inventors: Soon-Min Bae, Changwon (KR); Moo-Kyung Song, Changwon (KR); Je-Youl Chon, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 374 days.

(21) Appl. No.: 13/888,532

(22) Filed: May 7, 2013

(65) Prior Publication Data

US 2014/0022394 A1     Jan. 23, 2014

(30) Foreign Application Priority Data

Jul. 23, 2012  (KR) ........................ 10-2012-0080253

(51) Int. Cl.
*H04N 5/228* (2006.01)
*G06K 9/00* (2006.01)
*G06T 7/20* (2006.01)

(52) U.S. Cl.
CPC ........ *G06K 9/00624* (2013.01); *G06K 9/00771* (2013.01); *G06T 7/204* (2013.01); *G06T 2207/30236* (2013.01)

(58) Field of Classification Search
CPC .................................................... H04N 5/228
USPC ......... 348/169–172, 36, 222.1, 135, 143, 443
See application file for complete search history.

(56) References Cited

U.S. PATENT DOCUMENTS

| | | | |
|---|---|---|---|
| 2006/0187305 A1* | 8/2006 | Trivedi et al. | 348/169 |
| 2006/0215752 A1* | 9/2006 | Lee et al. | 375/240.08 |
| 2006/0215753 A1* | 9/2006 | Lee et al. | 375/240.08 |
| 2006/0244907 A1* | 11/2006 | Simmons | 351/162 |
| 2009/0207246 A1* | 8/2009 | Inami et al. | 348/135 |
| 2009/0231458 A1* | 9/2009 | Moriyama | 348/222.1 |
| 2010/0060732 A1* | 3/2010 | Tsuji et al. | 348/143 |
| 2010/0097443 A1* | 4/2010 | Lablans | 348/36 |
| 2010/0253688 A1* | 10/2010 | Cui et al. | 345/443 |
| 2011/0052050 A1* | 3/2011 | Cao et al. | 382/165 |
| 2011/0285851 A1 | 11/2011 | Plocher et al. | |
| 2011/0293141 A1 | 12/2011 | Robert et al. | |

FOREIGN PATENT DOCUMENTS

| | | |
|---|---|---|
| JP | 4873711 B2 | 2/2012 |
| KR | 10-1139389 B1 | 4/2012 |
| WO | 2011/136407 A1 | 11/2011 |

OTHER PUBLICATIONS

Yun, et al., "Interactive 3D Stereoscopic Image Editing System using Image-based modeling", KSIAM IT series, vol. 10, No. 2, pp. 53-66, 2006, The Korean Society for Industrial and Applied Mathematics.
Kim, et al., "Pedestrian Detection using Approximated Histogram of Oriented Gradients Descriptors", 38, Jul. 2011, pp. 382-386.

* cited by examiner

*Primary Examiner* — Paulos M Natnael
(74) *Attorney, Agent, or Firm* — Sughrue Mion, PLLC

(57) ABSTRACT

A method of tracking an object includes obtaining an image captured by a camera, setting a plurality of patterns having various sizes, according to a distance from a horizon in the image to a plurality of pixels in the image, extracting an object matching one of the plurality of patterns having various sizes, while scanning the image using the plurality of patterns having various sizes, and displaying information about a position of the extracted object in the image.

18 Claims, 10 Drawing Sheets

A PERSON

A BOTTLE

A CAT

A CAR

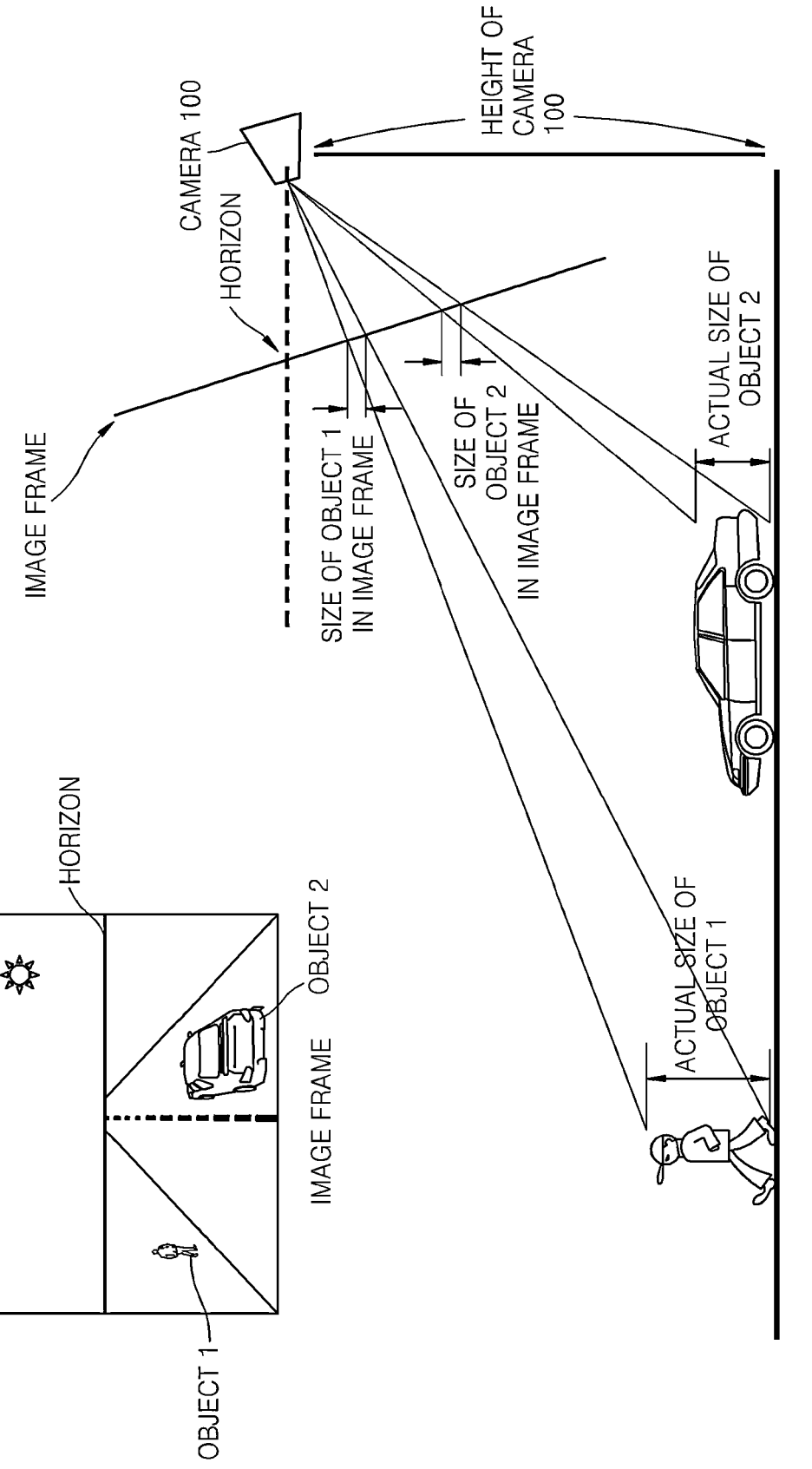

INFORMATION ABOUT POSITION OF OBJECT AND
INFORMATION ABOUT SIZE OF PATTERN

CURRENT IMAGE FRAME

NEXT IMAGE FRAME

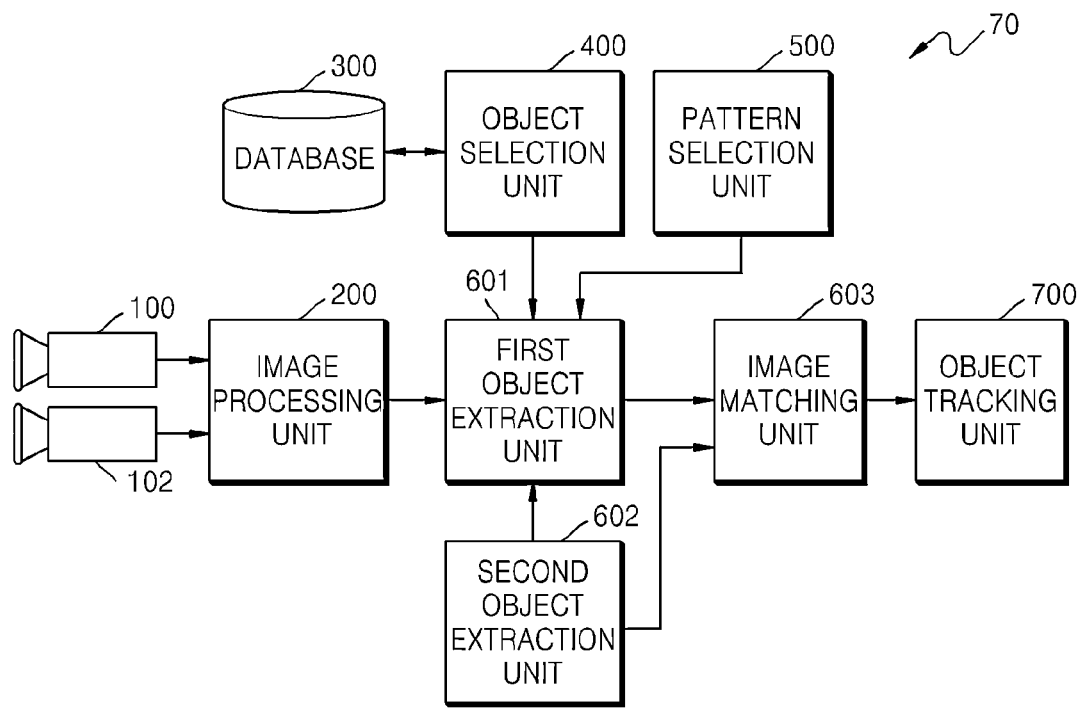

FIRST IMAGE FRAME

OBJECT 1

SECOND IMAGE FRAME

OBJECT 2

MATCHED IMAGE FRAME

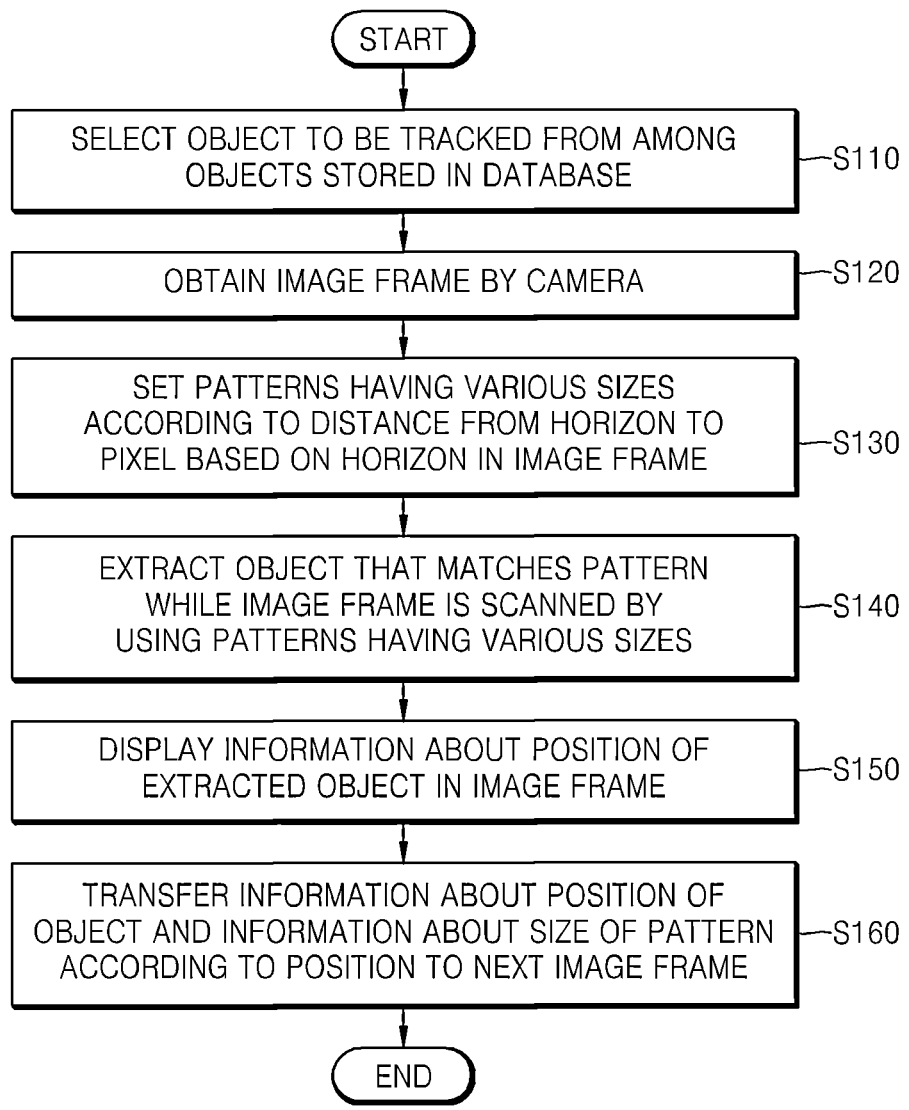

APPARATUS AND METHOD FOR TRACKING OBJECT

CROSS-REFERENCE TO RELATED PATENT APPLICATIONS

This application claims priority from Korean Patent Application No. 10-2012-0080253, filed on Jul. 23, 2012, in the Korean Intellectual Property Office, the disclosure of which is incorporated herein in its entirety by reference.

BACKGROUND

1. Field

Exemplary embodiments relate to an apparatus and method for tracking an object. More particularly, exemplary embodiments relate to an apparatus and method for quickly and accurately extracting and tracking an object in an image.

2. Description of the Related Art

A related art technology to detect and track an object, such as a person or a vehicle, has become important for image analysis research and surveillance/vigilance areas. The related art technology may be used to find out a person who committed a crime or a vehicle that violated traffic regulations, by installing a camera in a certain area. Also, the related art technology may be used to avoid obstacles or to detect and track an intruder by installing a camera on moving equipment.

In a related art object detecting method, a characteristic feature of an object to be detected may come from a still image. Further, in the related art, when a surrounding pattern matches a pattern of the object, a probable area from the still image is determined to be the detection object. However, in the related art, it takes a large amount of time to compare patterns, and real time detection is difficult. Further, in the related art, when the quality of an image is low or a used pattern does not accurately match the object to be detected, misdetection may occur many times.

SUMMARY

Exemplary embodiments may provide an apparatus and method for quickly and accurately extracting and tracking an object by scanning an image frame using patterns having various sizes.

According to an aspect of the exemplary embodiment, a method of tracking an object includes obtaining an image captured by a camera, setting a plurality of patterns having various sizes, according to a distance from a horizon in the image to a plurality of pixels in the image, extracting an object matching one of the plurality of patterns having various sizes, while scanning the image using the plurality of patterns having various sizes, and displaying information about a position of the extracted object in the image.

The method may further include selecting an object to be tracked, from among a plurality of objects stored in a database, before the image is obtained.

The plurality of objects may be stored in the database in a histogram of gradient (HOG) form, which indicates brightness distribution orientations to be used as a feature vector.

The setting the plurality of patterns may include detecting the horizon from the image; obtaining information about a height of the camera; obtaining information about an actual size of the object; and setting the plurality of patterns having various sizes to be used for scanning the image using the distance from the horizon in the image to the plurality of pixels in the image, the obtained information about the height of the camera, and the obtained information about the actual size of the object.

A size of at least one pattern in the plurality of patterns may be set according to the following equation.

$$\text{Pattern Size} = \frac{\text{Distance from Horizon to Pixel} \times \text{Actual Size of Object}}{\text{Height of Camera}}.$$

The extracting the object may include obtaining the object matching one of the plurality of patterns having various sizes, while scanning the image using the plurality of patterns having various sizes, and extracting an object to be tracked, from a plurality of objects stored in the database, by applying a support vector machine (SVM) to the obtained object.

The method may further include transferring the information about the position of the extracted object and information about a size of at least one pattern in the plurality of patterns, according to the position of the extracted object in a next image. Further, the method may include the image and the next image are each an image frame, and the next image is captured by the camera immediately after the image is captured by the camera The method may further include obtaining a first image captured by a first camera; and obtaining a second image captured by a second camera.

In the setting the plurality of patterns having various sizes, the various sizes of the plurality of patterns may be set according to the distance from the horizon to the plurality of pixels in the first image.

In the extracting the object, the first object may be matched with one of the plurality of patterns having various sizes, while scanning the first image using the plurality of patterns having various sizes.

The displaying information about the position of the extracted object may include displaying information about the position of an extracted first object on the first image, and displaying the information about the position of the extracted first object on the second image.

The method may further include storing the information about the position of the object and information about a size of at least one pattern in the plurality of patterns according to the position of the object, and transferring the information to a next first image when the first camera captures the next first image.

According to another aspect of the exemplary embodiment, an apparatus for tracking an object includes a pattern setting device which sets a plurality of patterns having various sizes, according to a distance from a horizon to a plurality of pixels and based on the horizon in an image, which is captured using a camera; an object extraction device with extracts an object matching one of the plurality of patterns having various sizes, while the image is scanned using the plurality of patterns having various sizes; and an object tracking device with displays information about a position of the extracted object in the image.

The apparatus may further include an object selection device which selects an object to be tracked, from among a plurality of objects stored in a database.

The pattern setting device may set the plurality of patterns having various sizes to be used for scanning the image by detecting the horizon in the image and obtaining information about a height of the camera and information about a size of the object.

The object tracking device may use, for a next image, the information about the position of the extracted object and information about a size of at least one pattern in the plurality of patterns, according to the position of the extracted object.

According to another aspect of the exemplary embodiment, an apparatus for tracking an object includes a first camera which captures a first image; a second camera which captures a second image; an object selection device which selects an object to be tracked, from among a plurality of objects stored in a database; a pattern setting device which sets a plurality of patterns having various sizes, according to a distance from a horizon to a plurality of pixels and based on the horizon in the first image; a first object extraction device which extracts a first object matching one of the plurality of patterns having various sizes, while the first image is scanned using the plurality of patterns having various sizes; a second object extraction device which extracts a second object using information about a position of the first object extracted from the first image and information about a size of at least one pattern in the plurality of patterns, according to the position of the first object extracted, to the second image; a matching device which matches the first image and the second image with respect to areas where the first object and the second object are extracted; and an object tracking device which displays information about the position of an extracted matched object in a matched image.

The pattern setting device may set the plurality of patterns having various sizes to be used for scanning the image by detecting the horizon from the first image and obtaining information about a height of the first camera and the second camera and information about a size of the object.

The object tracking device may store the information about the position of the first object extracted and the information about the size of the at least one pattern in the plurality of patterns according to the position, and transfer the information to a next first image when the first camera captures the next first image.

According to another aspect of the exemplary embodiment, a computer-readable recording medium having recorded thereon a program for executing a method of tracking an object, which includes obtaining an image captured by a camera; setting a plurality of patterns having various sizes, according to a distance from a horizon to a plurality of pixels, based on the horizon in the image; extracting an object matching one of the plurality of patterns having various sizes, while the image is scanned using the plurality of patterns having various sizes; and displaying information about a position of the extracted object in the image.

BRIEF DESCRIPTION OF THE DRAWINGS

The above and other features and advantages of the exemplary embodiments will become more apparent by describing in detail exemplary embodiments thereof with reference to the attached drawings in which:

FIGS. 3A and 3B are views for explaining pattern size setting of FIG. 1;

FIG. 7 is a block diagram schematically illustrating the structure of an object tracking apparatus according to another embodiment;

FIG. 9 is a flowchart for explaining a method of tracking an object according to an embodiment.

DETAILED DESCRIPTION OF THE EXEMPLARY EMBODIMENTS

Figure 1:
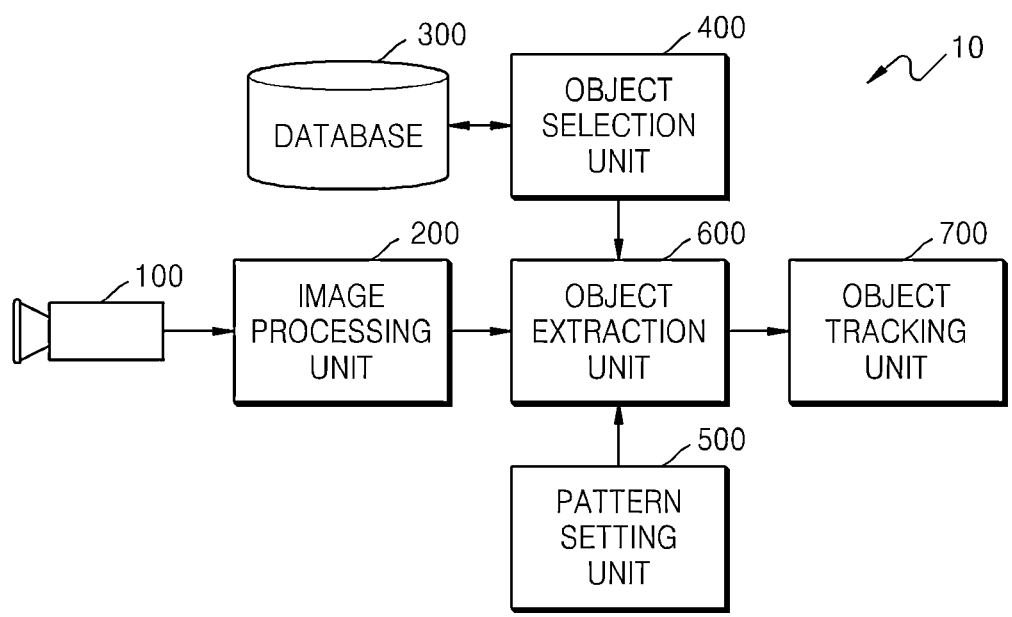
FIG. 1 is a block diagram schematically illustrating the structure of an object tracking apparatus according to an embodiment.

As the exemplary embodiments allows for various changes and numerous embodiments, particular embodiments will be illustrated in the drawings and described in detail in the written description. However, this is not intended to limit the exemplary embodiments to particular modes of practice, and it is to be appreciated that all changes, equivalents, and substitutes that do not depart from the spirit and technical scope of the exemplary embodiments are encompassed in the exemplary embodiments. In the description of the exemplary embodiments, certain detailed explanations of related art are omitted when it is deemed that they may unnecessarily obscure the essence of the exemplary embodiments.

Terms such as "first" and "second" are used herein merely to describe a variety of constituent elements, but the constituent elements are not limited by these terms. These terms are used only for the purpose of distinguishing one constituent element from another constituent element.

The terms used in the present specification are merely used to describe particular embodiments, and are not intended to limit the exemplary embodiments. An expression used in the singular encompasses the expression used in the plural, unless it has a clearly different meaning in the context. In the present specification, it is to be understood that terms such as "including" or "having," etc. are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The exemplary embodiments may be described in terms of functional block components and various processing steps. Such functional blocks may be realized by any number of hardware and/or software components configured to perform the specified functions. For example, the exemplary embodiments may employ various integrated circuit components, e.g., memory elements, processing elements, logic elements, look-up tables, and the like, which may carry out a variety of functions under the control of one or more microprocessors or other control devices. As an example, any of the object selection unit 400, the image processing unit 200, the object extraction unit 600, the object tracking unit 700, the pattern setting unit 500, the first object extraction unit 601, the second object extraction unit 602, and the image matching unit 603 may include a processor, a hardware module, or an integrated circuit for performing their respective functions. Similarly, where the elements of the exemplary embodiments are implemented using software programming or software elements, the exemplary embodiments may be implemented with any programming or scripting language such as C, C++, Java, assembler, etc., with the various algorithms being implemented with any combination of data structures, objects, processes, routines or other programming elements. Functional aspects may be implemented in algorithms that execute on one or more processors. Furthermore, the exemplary embodiments may employ any number of related art techniques for electronics configuration, signal processing and/or control, data processing, etc. The words "mechanism" and "element" are used broadly and are not limited to mechanical or physical embodiments, but may include software routines in conjunction with processors, etc.

Hereinafter, the exemplary embodiments will be described in detail by explaining preferred embodiments with reference to the attached drawings. Like reference numerals in the drawings denote like elements, and redundant descriptions are omitted.

FIG. 1 is a block diagram schematically illustrating the structure of an object tracking apparatus 10 according to an embodiment. Referring to FIG. 1, the object tracking apparatus 10 includes a camera 100, an image processing unit 200, a database 300, an object selection unit 400, a pattern setting unit 500, an object extraction unit 600, and an object tracking unit 700.

The camera 100 captures an image of an object by using, for example, a complementary metal-oxide semiconductor (CMOS) module or a charge coupled device (CCD) module. An input image frame is provided to the CMOS module or CCD module via lenses. The CMOS module or CCD module converts an optical signal bouncing off the object and passing through the lenses into an electric signal, and outputs the electric signal to generate an image frame.

The image processing unit 200 reduces noise of the image frame output from the camera 100, and performs image signal processing for improving image quality, such as gamma correction, color filter array interpolation, color matrix, color correction, color enhancement, etc.

Also, the image processing unit 200 may generate an image file by compressing image data generated through the image signal processing for improving image quality, or may restore the image data from the image file. A compression format of an image may be a reversible format or an irreversible format.

Also, the image processing unit 200 may perform color processing, blur processing, sharpening processing, image analysis processing, image recognition processing, image effect processing, etc. The image recognition processing may include face recognition, scene recognition, etc. For example, the image processing unit 200 may perform brightness level adjustment, color correction, contrast adjustment, outline enhancement processing, screen division processing, character image generation, image synthesis processing, etc.

The database 300 stores various pieces of information about object models. FIG. 2 illustrates various types of object models stored in the database 300. For example, various pieces of information about object models, such as a person, a bottle, a cat, and a car, are stored in the database 300. However, the object models stored in the database 300 are not limited to the above examples, and a variety of types of object models may be stored in the database 300. Also, information about the actual size of an object model, for example, the height of a person (170 cm) or the height of a car (120 cm), may be stored together in the database 300.

The object models are stored in the database 300 in the form of a histogram of gradient (HOG), which indicates brightness distribution orientations to be used as a feature vector.

A HOG algorithm is one of various algorithms to extract a characteristic feature of an object. According to the HOG algorithm, an image is divided into a plurality of squared grids in a checkerboard pattern, and a local histogram of distribution orientations of brightness is calculated in each square grid. In particular, a feature vector of the converted image is easily extracted using a cell formed of a plurality of pixels and a block formed of a plurality of cells.

Figure 2A:
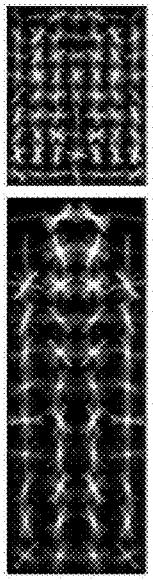
FIGS. 2A through 2D are views illustrating object models stored in the database of FIG. 1.
Figure 2B:
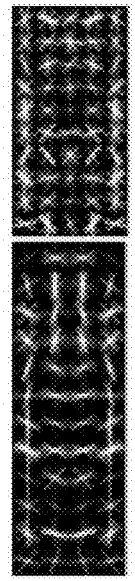
Figure 2C:
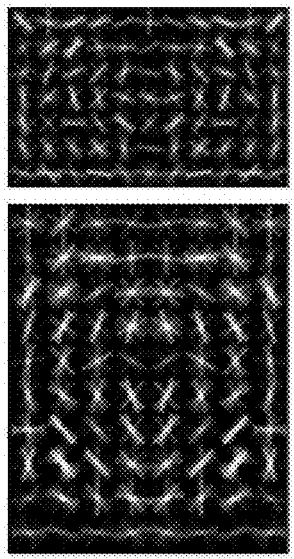
Figure 2D:
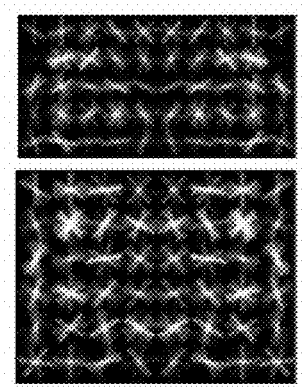

FIG. 2A illustrates a feature vector extracted by applying the HOG algorithm, in the case of a person as an object model. FIGS. 2B, 2C, and 2D illustrate feature vectors of a bottle, a cat, and a car, respectively.

Although in the present embodiment the HOG algorithm is used to extract the characteristic features of object models, exemplary embodiments are not limited thereto. A variety of methods, such as image normalization, self-quotient image (SQI), modified census transform (MCT), etc., may be used for extracting a characteristic feature of an object model.

The object selection unit 400 selects an object model to track various object models stored in the 300. For example, the object selection unit 400 may select a person or another object represented by the HOG, according to a user's selection.

The pattern setting unit 500 sets a plurality of patterns having various sizes, according to a distance from the horizon in an image frame to a plurality of pixels in the same image frame. To set a pattern size, the pattern setting unit 500 detects the horizon from the image frame, and obtains information about the distance from the horizon to a pixel, information about the actual height of the camera 100, and information about the actual size of an object. The information about the actual height of the camera 100 is preset, and the information about the actual size of an object may be searched for in the database 300.

The pattern setting unit 500 detects the horizon from the image frame. The detection of the horizon may be described as a method of dividing an image into a sky region and a non-sky region. Horizon detection methods may be mainly classified into two methods.

A first method is a region based approach, utilizing a characteristic feature of an image that a sky region occupies most of an upper portion of an image. A critical value is used to detect the horizon. To obtain the critical value, a difference in brightness between a plurality of small filters and an image is used. After the critical value is obtained, a vertical top to down search process is performed. Then, a point having a brightness value equal to or less than the critical value is determined as the beginning point of the horizon.

A second method is an edge based approach, wherein a gradient value is used to detect the horizon defined as a boundary between two separate regions. The pattern setting unit 500 may detect the horizon in an image frame by using this method. Thus, information about the position of the horizon may be obtained.

A pattern size set by the pattern setting unit 500 may be calculated based on the assumption that a distance from the horizon to a pixel in an image frame and a ratio of a size (pattern size) of an object in the image frame are the same as the height of the camera 100 and the ratio of an actual size of an object set by the object selection unit 400, respectively. Thus, the pattern size, of an object in an image frame may be calculated by using the following equation based on the above assumption.

$$\text{Pattern Size} = \frac{\text{Distance from Horizon to Pixel} \times \text{Actual Size of Object}}{\text{Height of Camera}} \quad \text{[Equation 1]}$$

FIGS. 3A and 3B are views for explaining the pattern size setting of FIG. 1. FIG. 3A illustrates an image frame of the scene of FIG. 3B, captured by the camera 100. FIG. 3B illustrates an actual scene for capturing an image frame. Referring to FIGS. 3A and 3B, the information about the position of the horizon, the information about the actual height of the camera 100, and the information about the actual size of an object are substituted in Equation 1. Thus, the size of an object, e.g., a pattern size, of an image frame may be set.

Figure 4:
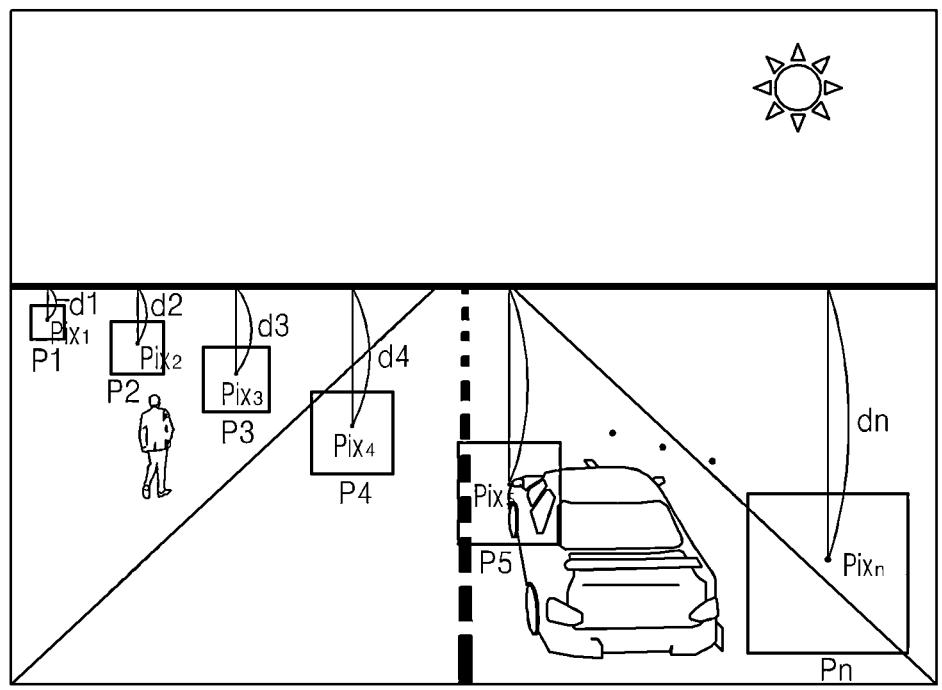
FIG. 4 is a view schematically illustrating various pattern sizes set in the image frame of FIG. 1.

FIG. 4 is a view schematically illustrating a change in a pattern size according to a distance from the horizon to a pixel in an image frame, with respect to an object set by the object selection unit 400. Referring to FIG. 4, the pattern setting unit 500 obtains information about the position of the horizon, an object to be tracked, information about the actual size of the object, and information about the actual height of the camera 100. In this state, the pattern setting unit 500 sets a pattern size P1 by applying the above information and a distance d1 from the horizon to a predetermined pixel $pix_1$ to Equation 1. Also, the pattern setting unit 500 sets a pattern size P2 by applying the above information and a distance d2 from the horizon to a predetermined pixel $pix_2$ to Equation 1. In the same manner, the pattern setting unit 500 may set pattern sizes P1-Pn by applying the above information and distances d1-dn from the horizon to predetermined pixels $pix_1$-$pix_n$ to Equation 1.

The pattern size may vary according to the type of an object, information about an actual size of an object, and position of the horizon. In a related art technology, a considerable amount of time is consumed for comparing patterns in order to detect an object by applying a plurality of patterns having different sizes to each pixel.

However, in the present embodiment, since the pattern comparison to detect an object is performed with patterns set according to the distance from the horizon to a pixel, a pattern comparison time is drastically reduced, in comparison to the related art technology.

The object extraction unit 600 scans an image frame with patterns set to different sizes, and extracts an object matching one of the patterns.

Figure 5A:
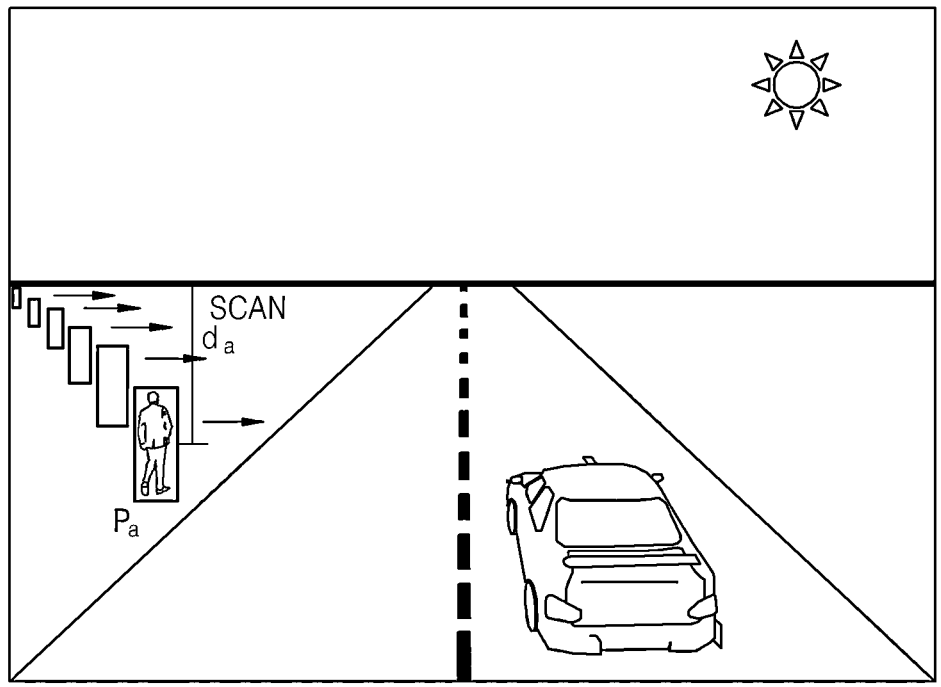
FIGS. 5A and 5B are view schematically illustrating extraction of an object during scanning of an image frame by using patterns having various sizes according to the set object of FIG. 1.
Figure 5B:
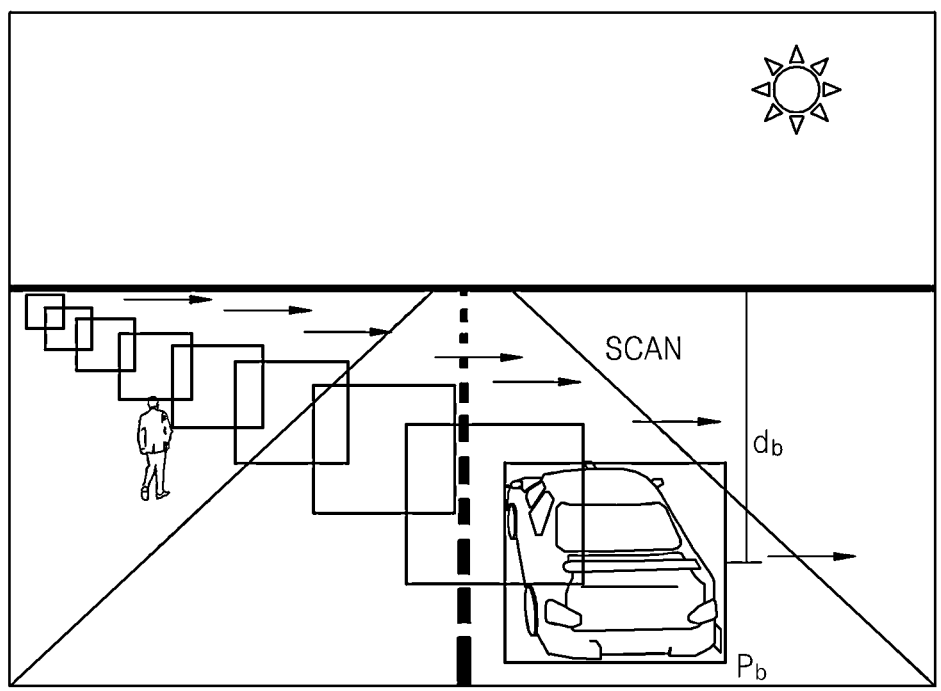

FIGS. 5A and 5B are views schematically illustrating scanning of an image frame with patterns set to different sizes, in order to extract an object matching one of the patterns by the object extraction unit 600. Tracking an object when the object is a person is described with reference to FIG. 5A. In FIG. 5A, the pattern setting unit 500 already has information about the position of the horizon, information about an actual size of the person, and information about an actual height of the camera 100. The pattern setting unit 500 sets patterns P1-Pn by applying the distances d1-dn from the horizon to the predetermined pixels $pix_1$-$pix_n$ to Equation 1. The object extraction unit 600 scans an image frame with the patterns P1-Pn set to different sizes, and extracts a person matching the pattern. It can be seen from FIG. 5A that a person matching a pattern $P_a$, i.e., an object, is extracted while scanning an image frame with the pattern size $P_a$ calculated at a distance $d_a$.

Tracking an object when the object is a car is described below with reference to FIG. 5B. In FIG. 5B, The pattern setting unit 500 already has information about the position of the horizon, information about an actual size of the car, and information about an actual height of the camera 100. The pattern setting unit 500 sets patterns P1-Pn by applying the distances d1-dn from the horizon to the predetermined pixels $pix_1$-$pix_n$ to Equation 1. The object extraction unit 600 scans an image frame with the patterns P1-Pn set to different sizes, and extracts a car matching the pattern. It can be seen from FIG. 5B that a car matching a pattern $P_b$, i.e., an object, is extracted while scanning an image frame with the pattern size $P_b$ calculated at a distance $d_b$.

The object extraction unit 600 classifies the objects into an important area candidate group and a non-important area candidate group by applying a support vector machine (SVM) to the extracted objects, and may extract an object to be tracked from the important area candidate group.

The object tracking unit 700 displays the information about the position of the extracted object, and the information about the pattern size of the extracted object on a current image frame. Then, the object tracking unit 700 transfers the information displayed on the current image frame, i.e., information about the position of the extracted object and the information about the pattern size of the extracted object to the next image frame, to display the next image frame.

Information about the position of the object on the next image frame may be evaluated from the information about the position of the object on the current image frame. Since the object tracking unit 700 can evaluate the position of the object on the next image frame, the object tracking unit 700 may also evaluate the size of a pattern for tracking the object. Thus, the time to extract and track the object may be reduced.

Alternatively, the object tracking unit 700 may use, without change, the information about the position of the object on the current image frame, and the information about the size of a pattern to the next image frame. The position of an object and the size of a pattern on the next image frame are not much different from those on the current image frame. Accordingly, the time to extract and track the object may be reduced by slightly adjusting the position of an object, and the size of a pattern on the current image frame during the extraction of an object on the next image frame.

Figure 6A:
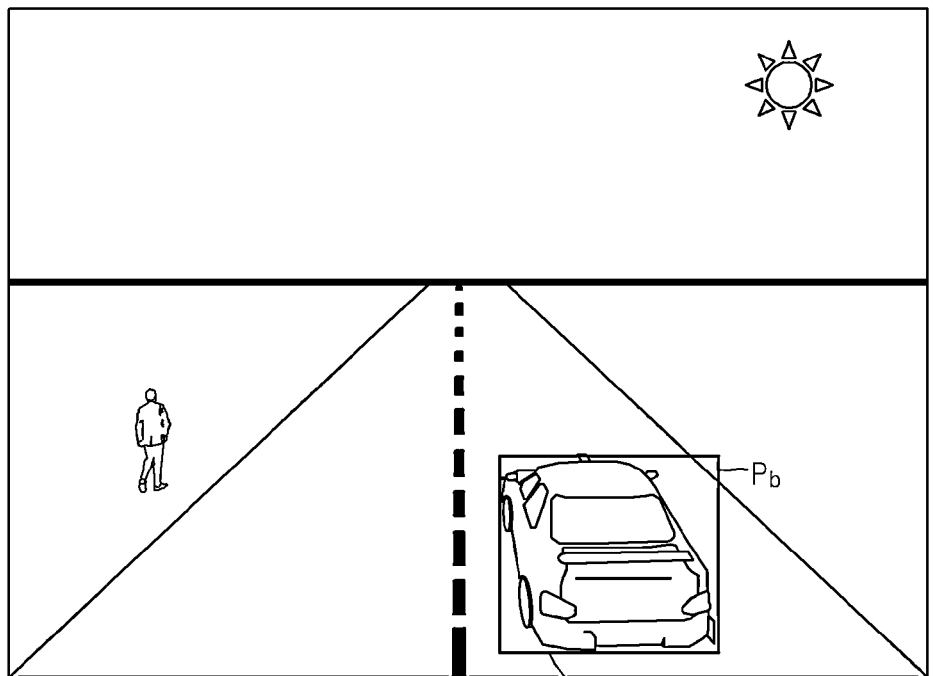
FIGS. 6A and 6B are views schematically illustrating patterns on a current image frame and a next image frame.
Figure 6B:
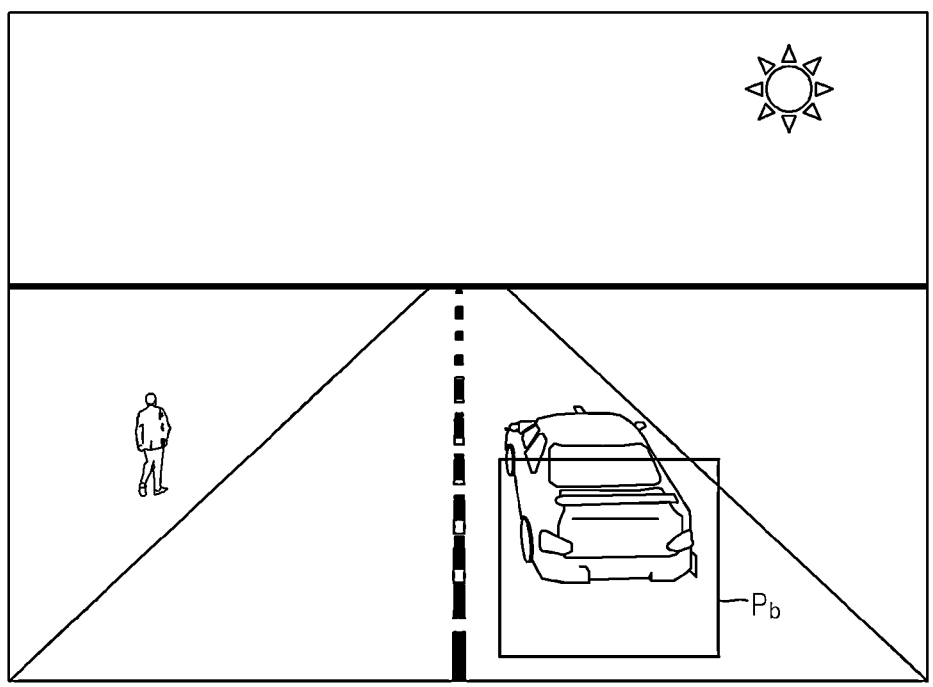

FIG. 6A illustrates a case where, after a car, for example, is selected as an object and extracted, the object tracking unit 700 displays information about the position of the object and information about the size of a pattern on a current image frame. FIG. 6B illustrates a case where the object tracking unit 700 displays the information about the position of the object (car) of the current image frame and the information about the size of a pattern on a next image frame. Therefore, the time to extract and track an object may be reduced by using the information about the position of an object and the information about the size of a pattern displayed on a current image frame, for the next image frame.

The extraction and tracking of an object are performed in subsequent frames by using the information about the position of the object and the information about the size of a pattern in the previous frame. Therefore, the tracking of an object may be possible by displaying the information about the position of the object and the information about the size of a pattern on each the image frame.

FIG. 7 is a block diagram schematically illustrating the structure of an object tracking apparatus 70 according to another embodiment. In the following description, redundant portions with the descriptions with reference to FIGS. 1 through 6 are omitted.

Referring to FIG. 7, the object tracking apparatus 70 according to another embodiment includes a first camera 101, a second camera 102, an image processing unit 200, a database 300, an object selection unit 400, a pattern setting unit 500, a first object extraction unit 601, a second object extraction unit 602, an image matching unit 603, and an object tracking unit 700. In comparison with FIG. 1 and FIG. 7, a 2D image may be used in the object tracking apparatus 10 of FIG. 1, and a 3D image may be used in the object tracking apparatus 70 of FIG. 7.

The first camera 101 and the second camera 102 are left and right cameras that capture an object by using, for example, a complementary metal-oxide semiconductor (CMOS) module or a charge coupled device (CCD) module. First and second input image frames are provided to the CMOS module or CCD module via lenses. The CMOS module or CCD module of each of the first and second cameras 101 and 102 convert an optical signal bouncing off the object and passing through the lenses into an electric signal (a capturing signal), and outputs the electric signal to generate an image frame.

The image processing unit 200 performs image processing with respect to first and second image frames output from the first and second cameras 100 and 200. The structure and functions of the image processing unit 200 are the same as presented above with reference to FIGS. 1 to 6.

The database 300 stores various pieces of information about object models. The object selection unit 400 selects an object model to be tracked, from among the various object models stored in the database 300. For example, the object selection unit 400 may set for tracking a person or car represented by HOG according to a user's selection.

The pattern setting unit 500 sets a plurality of patterns having various sizes according to the distance from the horizon a plurality of pixels in the first image frame captured by the first camera 101. Other descriptions of the pattern setting unit 500 are omitted because they are the same with the descriptions of the pattern setting unit of FIG. 1.

The first object extraction unit 601 scans the first image frame with patterns set to different sizes and extracts an object matching one of the patterns.

The second object extraction unit 602 extracts a second object, by using information about the position of the first object and information about the size of a pattern extracted from the first image frame by the first object extraction unit 601, to the second image frame.

If the second object extraction unit 602 extracts the second object in the same method as the first object extraction unit 601 extracts the first object, the first object extraction time and the second object extraction time, that is the same as the first object extraction time, are needed. However, since the second object extraction unit 602 extracts the second object by using the information about the position and pattern size of the first object from the first object extraction unit 601, the time for extracting the first object and the second object may be reduced.

The image matching unit 603 generates a 3D image by matching the first and second image frames with respect to areas where the first and second objects are extracted from.

The image matching unit 603 searches for a common characteristic in the first image frame captured by the first camera 101 and the second image frame captured by the second camera 102, and obtains one image by matching two images based on the searched common characteristic. In other words, for image matching, each of the first and second image frames is divided into a foreground area where the object exists and a background area that is the other area outside the foreground area, a common area of the background area of two image frames is searched for, and the two images are matched based on the common area. Since image matching is already well known, detailed descriptions thereof are omitted.

Figure 8A:
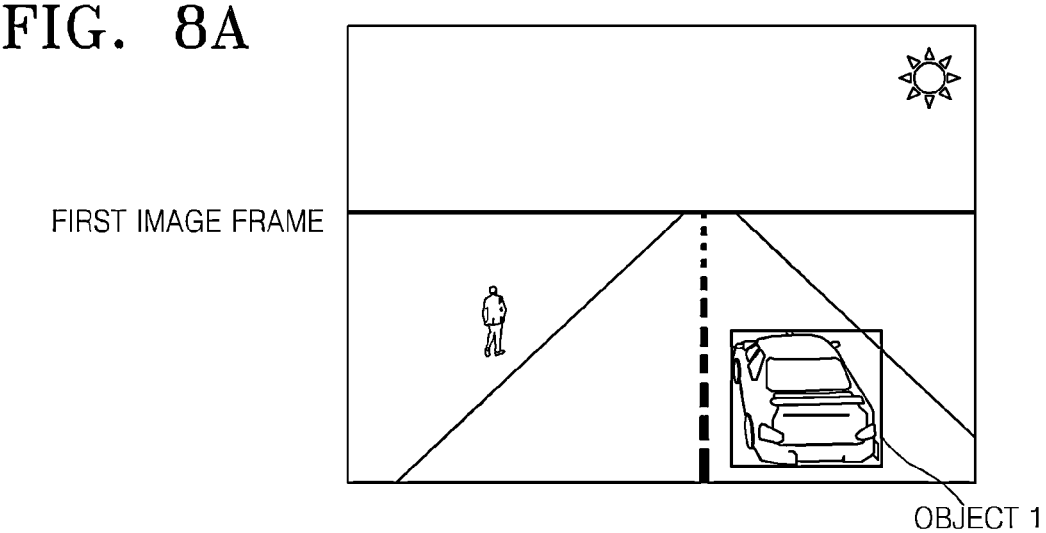
FIGS. 8A through 8C are views schematically illustrating extraction and matching of an object in first and second image frames respectively captured by first and second cameras of FIG. 7.
Figure 8B:
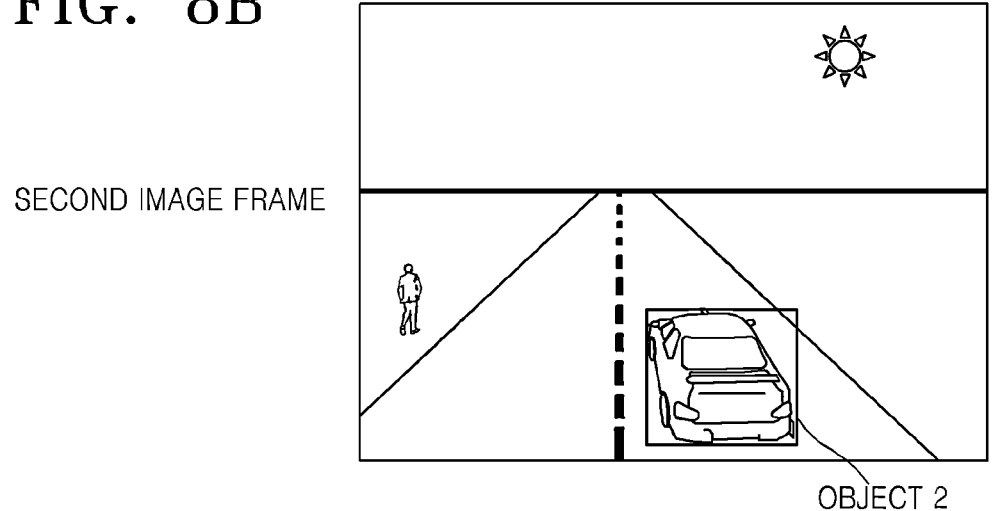
Figure 8C:
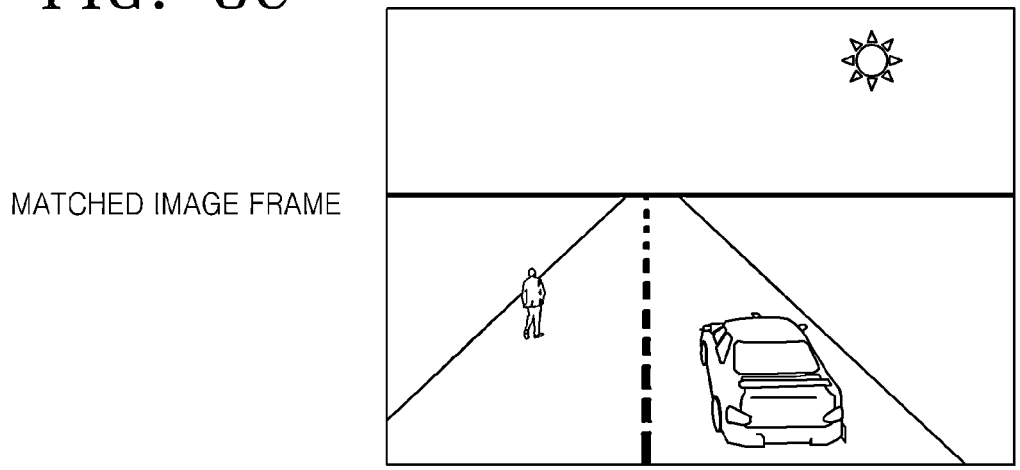

FIGS. 8A through 8C are views schematically illustrating extraction and matching of an object in the first and second image frames respectively, captured by the first and second cameras 101 and 102 of FIG. 7. FIG. 8A illustrates a first object (e.g., a car) extracted from the first image frame. FIG. 8B illustrates a second object (e.g., a car) extracted from the second image frame by using information about the position of the first object and information about the size of a pattern from the first image frame. FIG. 8C illustrates a result of matching the first image frame and the second image frame by the image matching unit 603.

The object tracking unit 700 displays the information about the position of the extracted object in a current matched image frame, and transfers the information about the position of the object displayed in the current matched image frame and the information about the size of a pattern corresponding to the extracted object to the first image frame. In order to reduce extraction and tracking time, information about the position of an object and information about the size of a pattern on the next image frame may be presumed from the information about the position of an object on the current image frame. Since the information about the position of an object is displayed in each of the input and matched image frames, the object may be tracked from a 3D image.

As described above, as various pattern sizes are set for each position of an object in an image and the image is scanned by using the set patterns, the object may be quickly and accurately extracted and tracked.

FIG. 9 is a flowchart for explaining a method of tracking an object with the object tracking apparatus 10 according to an embodiment. In the following description, redundant portions with the descriptions with reference to FIGS. 1 through 6 are omitted.

Referring to FIG. 9, the object tracking apparatus 10 performs selecting of an object to be tracked from among various object models stored in the database 300 (S110). The selecting of an object is not limited to the operation S110, and may be performed in any operation if the selecting of an object is completed before the object is extracted from the image frame.

When the selecting of an object to be tracked is completed, the object tracking apparatus 10 performs an operation of obtaining an image frame captured by the camera 100 (S120). When the obtaining of an image frame is completed, the object tracking apparatus 10 performs an operation of setting a plurality of patterns having various sizes according to a distance from the horizon in the image frame to a plurality of pixels in the image frame (S130).

When the setting of a pattern size is completed, the object tracking apparatus 10 performs an operation of scanning an image frame with the pattern set to different sizes, and extracting an object matching one of the patterns (S140).

When the extraction of the object is completed, the object tracking apparatus 10 performs an operation of displaying the information about the position of the extracted object on the current image frame (S150).

When the display of the information about the position of the object is completed, the object tracking apparatus 10 performs an operation of transferring the information about the position of the object displayed on the current image frame and the information about the size of a pattern corresponding to the extracted object to the next image frame, in order to extract the object from the next image frame (S160).

Therefore, as the information about the position of the object is displayed in each input image frame, quick and accurate tracking of an object becomes possible.

Figure 10:
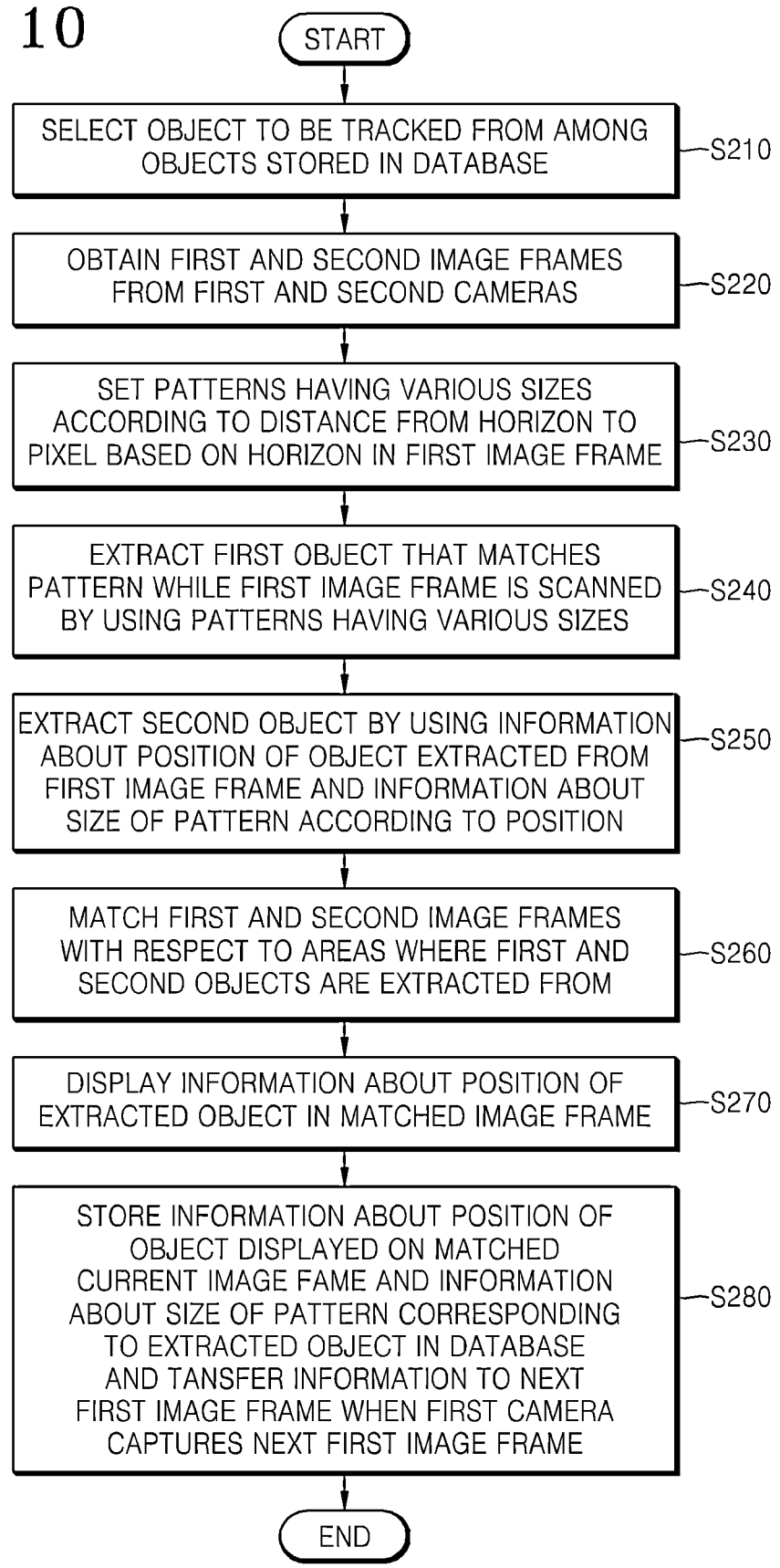
FIG. 10 is a flowchart for explaining a method of tracking an object according to another embodiment.

FIG. 10 is a flowchart for explaining a method of tracking an object according to another embodiment. In the following description, redundant portions with the descriptions with reference to FIGS. 1 through 7 are omitted.

Referring to FIG. 10, the object tracking apparatus 70, according to the present embodiment, performs selection of an object to be tracked from among the various object models stored in the 300 (S210). The selection of an object is not limited thereto, and may be performed in any operation if the selection of an object is completed before the object is extracted from the image frame.

When the selection of an object to be tracked is completed, the object tracking apparatus 70 performs an operation of obtaining first and second image frames captured by the first and second cameras 101 and 102 (S220).

When the obtaining of the first and second image frames is completed, the object tracking apparatus 70 performs an operation of setting a plurality of patterns having various sizes, according to a distance from the horizon to a plurality of pixels, based on the horizon extracted from the first image frame (S230).

When the setting of a pattern size is completed, the object tracking apparatus 70 performs an operation of scanning an image frame with pattern set different sizes, and extracting a first object matching one of the patterns (S240).

When the extraction of the first object is completed, the object tracking apparatus 70 performs an operation of extracting a second object by using the information about the position of the first object and the information about the size of the pattern extracted from the first image frame to the second image frame (S250). Since the second object is extracted by using the information about the position of the first object and the information about the size of the pattern, the time to extract the second object may be reduced.

When the extraction of the second object is completed, the object tracking apparatus 70 performs an operation of generating a 3D image by matching the first and second image frames with respect to areas where the first and second objects are extracted from (S260).

When the matching of the first and second images is completed, the object tracking apparatus 70 performs an operation of displaying the information about the position of the extracted object in the matched image frame (S270).

When the display of the information about the position of the object is completed, the object tracking apparatus 70 performs an operation of storing the information about the position of the object displayed on the matched current image frame and the information about the size of a pattern corresponding to the extracted object in the database 300, and transferring the information to the next first image frame when the first camera captures the next first image frame (S280).

Therefore, as the information about the position of the object is displayed in each input and matched image frame, quick and accurate tracking of an object becomes possible for a 3D image.

As described above, according to the exemplary embodiments, an object may be quickly and accurately extracted and tracked by scanning an image frame by using a plurality of patterns having various sizes.

The exemplary embodiments can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the exemplary embodiments can be easily construed by programmers skilled in the art to which the exemplary embodiments pertain.

While the exemplary embodiments has been particularly shown and described, it will be understood by those skilled in the art that various changes in form and details may be made therein without departing from the spirit and scope of the exemplary embodiments as defined by the appended claims.

What is claimed is:

1. A method of tracking an object, the method comprising:
    setting a plurality of patterns having various sizes, according to a distance from a horizon in an image to a plurality of pixels corresponding to the plurality of patterns in the image captured by a camera;
    extracting an object matching one of the plurality of patterns having various sizes, while scanning the image using the plurality of patterns having various sizes; and
    displaying information about a position of the extracted object in the image,
    wherein the setting the plurality of patterns comprises:
        detecting the horizon from the image;
        obtaining information about a height of the camera;
        obtaining information about an actual size of the object; and
        setting the plurality of patterns having various sizes to be used for scanning the image using the distance from the horizon in the image to the plurality of pixels in the image, the obtained information about the height of the camera, and the obtained information about the actual size of the object.

2. The method of claim 1, further comprising selecting an object to be tracked, from among a plurality of objects stored in a database, before the image is obtained.

3. The method of claim 2, wherein the plurality of objects are stored in the database in a histogram of gradient (HOG) form, which indicates brightness distribution orientations used as a feature vector.

4. The method of claim 1, wherein a size of at least one pattern in the plurality of patterns is set according to the equation:

$$\text{Pattern Size} = \frac{\text{Distance from Horizon to Pixel} \times \text{Actual Size of Object}}{\text{Height of Camera}}.$$

5. The method of claim 1, wherein the extracting the object comprises:
    obtaining the object matching one of the plurality of patterns having various sizes, while scanning the image using the plurality of patterns having various sizes; and
    extracting an object to be tracked, from a plurality of objects stored in the database, by applying a support vector machine (SVM) to the obtained object.

6. The method of claim 1, further comprising transferring the information about the position of the extracted object and information about a size of at least one pattern in the plurality of patterns, according to the position of the extracted object in a next image,
    wherein the image and the next image are each an image frame, and the next image is captured by the camera immediately after the image is captured by the camera.

7. The method of claim 1, further comprising:
obtaining a first image captured by a first camera; and
obtaining a second image captured by a second camera.

8. The method of claim 7, wherein, in the setting the plurality of patterns having various sizes, the various sizes of the plurality of patterns are set according to the distance from the horizon to the plurality of pixels in the first image.

9. The method of claim 8, wherein, in the extracting the object, the first object is matched with one of the plurality of patterns having various sizes, while scanning the first image using the plurality of patterns having various sizes.

10. The method of claim 9, wherein the displaying information about the position of the extracted object comprises:
displaying information about the position of an extracted first object on the first image; and
displaying the information about the position of the extracted first object on the second image.

11. The method of claim 10, further comprising storing the information about the position of the object and information about a size of at least one pattern in the plurality of patterns according to the position of the object, and transferring the information to a next first image when the first camera captures the next first image.

12. An apparatus for tracking an object, the apparatus comprising:
a pattern setting device which sets a plurality of patterns having various sizes, according to a distance from a horizon to a plurality of pixels corresponding to the plurality of patterns in an image captured by a camera;
an object extraction device which extracts an object matching one of the plurality of patterns having various sizes, while the image is scanned using the plurality of patterns having various sizes; and
an object tracking device which displays information about a position of the extracted object in the image,
wherein the pattern setting device sets the plurality of patterns having various sizes to be used for scanning the image by detecting the horizon in the image and obtaining information about a height of the camera and information about a size of the object.

13. The apparatus of claim 12, further comprising an object selection device which selects an object to be tracked, from among a plurality of objects stored in a database.

14. The apparatus of claim 12, wherein the object tracking device uses, for a next image, the information about the position of the extracted object and information about a size of at least one pattern in the plurality of patterns, according to the position of the extracted object.

15. An apparatus for tracking an object, the apparatus comprising:
a first camera which captures a first image;
a second camera which captures a second image;
an object selection device which selects an object to be tracked, from among a plurality of objects stored in a database;
a pattern setting device which sets a plurality of patterns having various sizes, according to a distance from a horizon to a plurality of pixels and based on the horizon in the first image;
a first object extraction device which extracts a first object matching one of the plurality of patterns having various sizes, while the first image is scanned using the plurality of patterns having various sizes;
a second object extraction device which extracts a second object using information about a position of the first object extracted from the first image and information about a size of at least one pattern in the plurality of patterns, according to the position of the first object extracted, to the second image;
a matching device which matches the first image and the second image with respect to areas where the first object and the second object are extracted; and
an object tracking device which displays information about the position of an extracted matched object in a matched image.

16. The apparatus of claim 15, wherein the pattern setting device sets the plurality of patterns having various sizes to be used for scanning the image by detecting the horizon from the first image and obtaining information about a height of the first camera and the second camera and information about a size of the object.

17. The apparatus of claim 15, wherein the object tracking device stores the information about the position of the first object extracted and the information about the size of the at least one pattern in the plurality of patterns according to the position, and transfers the information to a next first image when the first camera captures the next first image.

18. A non-transitory computer-readable recording medium having recorded thereon a program for executing a method of tracking an object, the method comprising:
setting a plurality of patterns having various sizes, according to a distance from a horizon to a plurality of pixels, based on the horizon in an image captured by a camera;
extracting an object matching one of the plurality of patterns having various sizes, while the image is scanned using the plurality of patterns having various sizes; and
displaying information about a position of the extracted object in the image,
wherein the setting the plurality of patterns comprises:
detecting the horizon from the image;
obtaining information about a height of the camera;
obtaining information about an actual size of the object; and
setting the plurality of patterns having various sizes to be used for scanning the image using the distance from the horizon in the image to the plurality of pixels in the image, the obtained information about the height of the camera, and the obtained information about the actual size of the object.

* * * * *